US012620014B2

(12) United States Patent　　(10) Patent No.:　US 12,620,014 B2
Iyer et al.　　(45) Date of Patent:　May 5, 2026

(54) SYSTEM, METHOD, AND COMPUTER READABLE MEDIUM FOR DETERMINING ATTRIBUTE AFFINITIES FOR USERS

(71) Applicant: Walmart Apollo, LLC, Bentonville, AR (US)

(72) Inventors: Rahul Radhakrishnan Iyer, Sunnyvale, CA (US); Shashank Kedia, Sunnyvale, CA (US); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 519 days.

(21) Appl. No.: 17/513,495

(22) Filed: Oct. 28, 2021

(65) Prior Publication Data

US 2023/0153883 A1　　May 18, 2023
US 2023/0368263 A2　　Nov. 16, 2023

(51) Int. Cl.
　*G06Q 30/06*　　　(2023.01)
　*G06Q 30/0204*　　(2023.01)
　*G06Q 30/0601*　　(2023.01)

(52) U.S. Cl.
　CPC ..... *G06Q 30/0631* (2013.01); *G06Q 30/0204* (2013.01); *G06Q 30/0627* (2013.01)

(58) Field of Classification Search
　CPC ........................... G06Q 30/06; G06Q 30/0631
　See application file for complete search history.

(56) References Cited

U.S. PATENT DOCUMENTS

| 7,756,879 | B2 | 7/2010 | Parsons et al. |
| 8,370,203 | B2 | 2/2013 | Dicker et al. |
| 8,538,807 | B2 | 9/2013 | Dishneau et al. |
| 9,773,268 | B2 | 9/2017 | Bonner et al. |
| 9,817,846 | B1 | 11/2017 | Srinivasan et al. |

(Continued)

FOREIGN PATENT DOCUMENTS

CN　　　107833117　B　　　3/2020

OTHER PUBLICATIONS

"Complement graph". Wikipedia. (Jul. 21, 2017). https://web.archive.org/web/20190113094629/https://en.wikipedia.org/wiki/Complement_graph (Updated Jan. 13, 2019).*

(Continued)

*Primary Examiner* — Jeffrey A. Smith
*Assistant Examiner* — Jennifer V Lee
(74) *Attorney, Agent, or Firm* — Morgan, Lewis & Bockius LLP; Manita Rawat

(57)　　　　　ABSTRACT

In some examples, a system may be configured to, for at least a first user of the plurality of users, implement a first set of operations that generate, for each of a first set of item types, attribute value data. Additionally, the system may implement a second set of operations that generate, for each of a second set of item types identified in catalogue data, clique data. Moreover, the system may, for the at least first user, implement a third set of operations that generate preference dependency data. Further, the system may, for the at least first user, based on the preference dependency data, the clique data, the attribute value data, generate, for each item type of a set of item types, output data including an affinity value for each item type of the first set of item types.

12 Claims, 8 Drawing Sheets

500

(56) References Cited

U.S. PATENT DOCUMENTS

| | | | |
|---|---|---|---|
| 10,068,284 | B1 | 9/2018 | Zisk et al. |
| 10,198,764 | B2 | 2/2019 | Nihalani et al. |
| 10,304,082 | B1 | 5/2019 | Bhagat et al. |
| 11,100,400 | B2 | 8/2021 | Fang et al. |
| 11,580,585 | B1 | 2/2023 | Rajana et al. |
| 2001/0021914 | A1* | 9/2001 | Jacobi .................... G06Q 30/02 |
| | | | 705/26.1 |
| 2013/0290369 | A1 | 10/2013 | Sayers et al. |
| 2014/0074649 | A1 | 3/2014 | Patel et al. |
| 2018/0060696 | A1* | 3/2018 | Chen ................. G06Q 30/0251 |
| 2022/0188895 | A1* | 6/2022 | Lipka ...................... G06N 5/04 |

OTHER PUBLICATIONS

Zhang, Mingyue, et al. 2019. Identifying Complements and Substitutes of Products: A Neural Network Framework Based on Product Embedding. ACM Trans. Knowl. Discov. Data 13, 3, Article 34 (Jun. 2019), 29 pages. https://doi.org/10.1145/3320277.*
V. Kumar et al., "Knowing What to Sell, When, and to Whom," Harvard Business Review Magazine, https://hbr.org/2005/03/knowing-what-to-sell-when-and-to-whom, Mar. 2006, 17 pages.
Wang, et al., "Personalized Embedding-based e-Commerce Recommendations at eBay", Proceedings of ACM Conference (Conference'17). ACM, New York, NY, USA, Jul. 2017 9 pages.
Rendle, et al., "BPR: Bayesian personalized ranking from implicit feedback", UAI '09: Proceedings of the Twenty-Fifth Conference on Uncertainty in Artificial IntelligenceJun. 2009 pp. 452-461.
Huang, et al., "A Graph Model for E-Commerce Recommender Systems" Journal of the American Society for Information Science and Technology, 2004, 55(3):259-274.
Ngaffo, et al., "A Bayesian Inference Based Hybrid Recommender System", IEEE Access, Jun. 2020, 8:101682-101701.

* cited by examiner

200

400

401

500

For at least a first user of a plurality of users, obtain transaction data.
502

Implement a first set of operations that generate attribute data.
504

Implement a second set of operations that generate clique data.
506

Implement a third set that generate preference dependencies data.
508

Generate, for each item type of a set of item types, output data.
510

600

Identify a set of item types.
602

Extract, for each item type of the set of item types, a set of attribute features.
604

Determine, for each attribute feature of the set of attribute features, an attribute value.
606

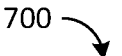

700

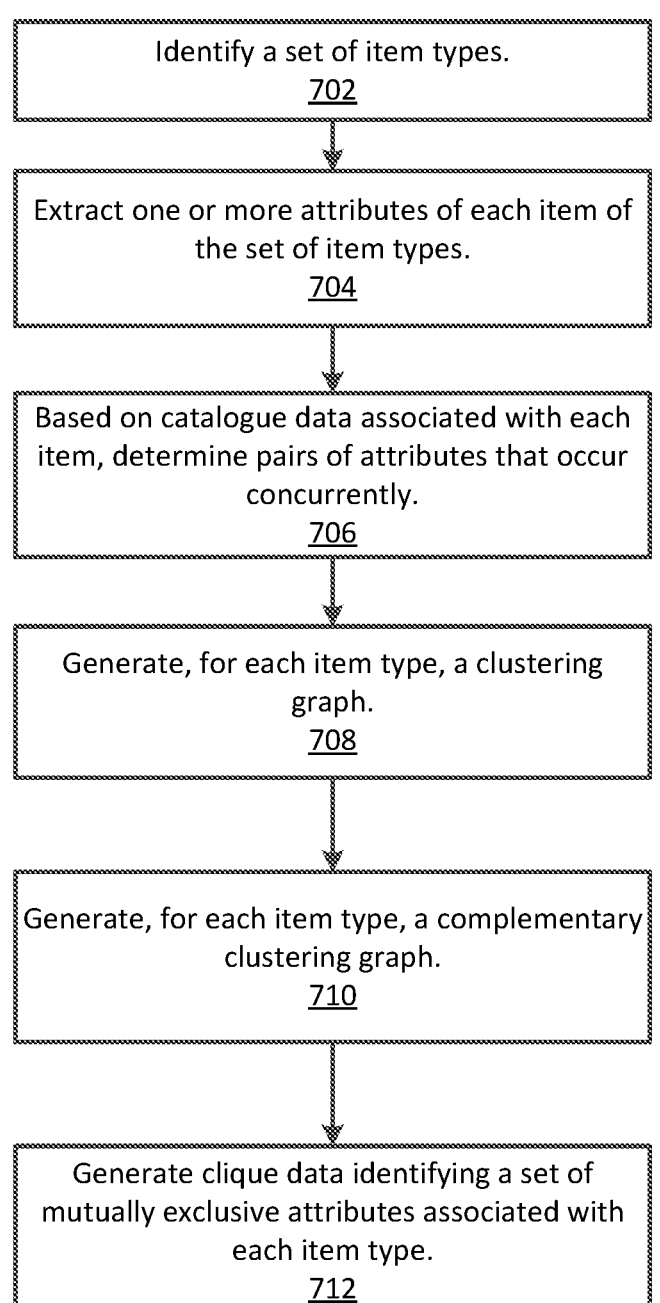

Identify a set of item types.
702

Extract one or more attributes of each item of
the set of item types.
704

Based on catalogue data associated with each
item, determine pairs of attributes that occur
concurrently.
706

Generate, for each item type, a clustering
graph.
708

Generate, for each item type, a complementary
clustering graph.
710

Generate clique data identifying a set of
mutually exclusive attributes associated with
each item type.
712

FIG. 7

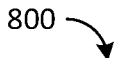
800
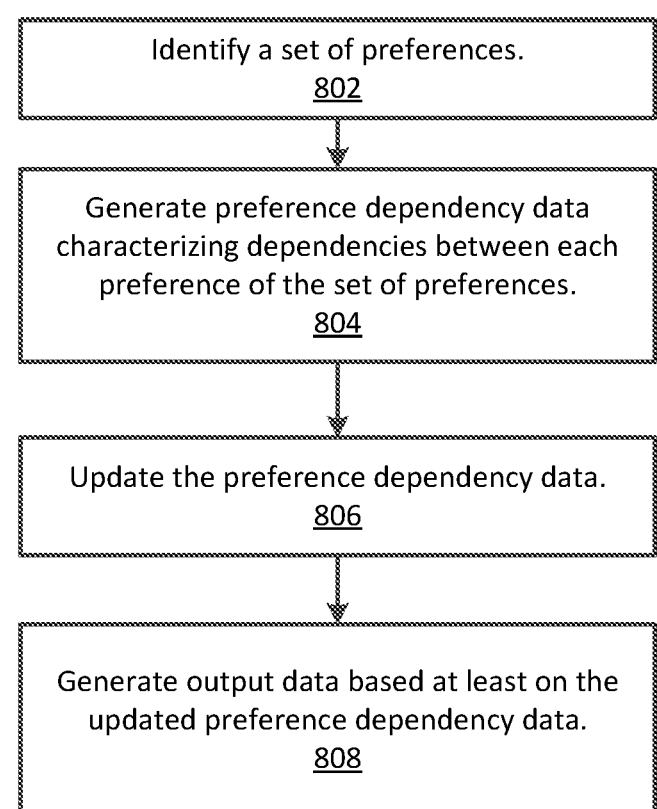
Identify a set of preferences.
802
Generate preference dependency data
characterizing dependencies between each
preference of the set of preferences.
804
Update the preference dependency data.
806
Generate output data based at least on the
updated preference dependency data.
808
FIG. 8

SYSTEM, METHOD, AND COMPUTER READABLE MEDIUM FOR DETERMINING ATTRIBUTE AFFINITIES FOR USERS

TECHNICAL FIELD

The disclosure relates generally to network services, and more specifically, to automatically determining, generating, and providing user profiles.

BACKGROUND

At least some ecommerce entities can include recommendation systems that can personalize a user experience for different channels, such as an ecommerce platform with a search engine system, provided by the ecommerce entity. Conventionally, the recommendation systems of an ecommerce entities are based on information extracted from catalogue data established by the ecommerce entity. Such systems, may not take into account particular attributes of a user the recommendation is making recommendations for, and as such, may affect the recommendation-to-purchase rates (e.g., the rate at which users purchase items or products appearing in recommendations provided by the recommendation system) and may result in wasted computational resources in providing such recommendations (e.g., the recommendations are ignored).

For example, an ecommerce entity may provide an online ecommerce platform, such as a website, along with a search engine system that can enable customer to search for products that the ecommerce entity provides. The website may include a search bar that allows the users to enter search terms, such as one or more words, that the website uses to search for products. In response to the search terms, a recommendation system of the website, may implement a search algorithm to generate a search result including products that meet the requirements of the search algorithm. However, such requirements may be based on information extracted from catalogue data established by the retailer, and may not take into account particular attributes of the user. As such, in such conventional systems, these search results may not be as accurate to the user submitting them and may affect the search-to-purchase conversion rate of the online ecommerce platform (e.g., the rate at which users purchase items or products appearing in search results stemming from search queries requested by the users).

SUMMARY

The embodiments described herein are directed to recommendation systems associated with one or more channels of ecommerce entities, such as an online ecommerce platform with a search engine. As described herein a channel of the one or more channels may refer to a particular data process or pipeline, such as those associated with as search engine system of an online ecommerce platform of an ecommerce entity, a notification system, and/or a complementary item recommendation system. In accordance with various embodiments, exemplary computing systems may be implemented in any suitable hardware or hardware and software, such as in any suitable computing device. In some embodiments a system may include a database storing catalogue data and, for each user of a plurality of users of an online platform, transaction data, engagement data and search query data. Additionally, the system may include at least one processor executes the instructions to, for at least a first user of the plurality of users and based on the transaction data of the at least first user, implement a first set of operations that generate, for each of a first set of item types, attribute value data characterizing an attribute value for each attribute feature of one or more items associated with each of the first set of item types. In some examples, each attribute feature being associated with preference of a set of preferences. Moreover, the at least one processor executes the instructions to, for the at least first user and based on the catalogue data, implement a second set of operations that generate, for each of a second set of item types identified in the catalogue data, clique data characterizing one or more cliques. In some examples, each of the one or more cliques identifying a subset of attribute features of a set of attribute features that are mutually exclusive. Further, the at least one processor executes the instructions to, for the at least first user and based at least in part on the transaction data, engagement data and search query data of at least the first user, implement a third set of operations that generate dependency data characterizing one or more dependencies between each preference of the set of preferences. Additionally, the at least one processor executes the instruction to, for the at least first user and based on the dependency data, the clique data, the attribute value data, generate, for each item type of a set of item types, output data including an affinity value for each item type of the first set of item types.

In other embodiments, a computer-implemented method is provided that includes, for at least a first user of the plurality of users and based on the transaction data of the at least first user, implementing a first set of operations that generate, for each of a first set of item types, attribute value data characterizing an attribute value for each attribute feature of one or more items associated with each of the first set of item types. In some examples, each attribute feature being associated with preference of a set of preferences. Moreover, the computer-implemented method further includes, for the at least first user and based on the catalogue data, implementing a second set of operations that generate, for each of a second set of item types identified in the catalogue data, clique data characterizing one or more cliques. In some examples, each of the one or more cliques identifying a subset of attribute features of a set of attribute features that are mutually exclusive. Further, the computer-implemented method also includes, for the at least first user and based at least in part on the transaction data, engagement data and search query data of at least the first user, implementing a third set of operations that generate preference dependency data characterizing one or more dependencies between each preference of the set of preferences. Additionally, the computer-implemented method includes, for the at least first user and based on the preference dependency data, the clique data, the attribute value data, generating, for each item type of a set of item types, output data including an affinity value for each item type of the first set of item types.

In various embodiments, a non-transitory computer readable medium has instructions stored thereon, where the instructions, when executed by the at least one or more processors, cause a system to, for at least a first user of a plurality of users and based on transaction data of at least the first user, implement a first set of operations that generate, for each of a first set of item types, attribute value data characterizing an attribute value for each attribute feature of one or more items associated with each of the first set of item types. In some examples, each attribute feature being associated with preference of a set of preferences. Additionally, the system may, for at least the first user of the plurality of users and based on the catalogue data, implement a second set of operations that generate, for each of a second set of item types identified in the catalogue data, clique data characterizing one or more cliques. In some examples, each of the one or more cliques identifying a subset of attribute features of a set of attribute features that are mutually exclusive. Further, the system may, for at least the first user of the plurality of users and based at least in part on the transaction data, engagement data and search query data of at least the first user, implement a third set of operations that generate preference dependency data characterizing one or more dependencies between each preference of the set of preferences. Additionally, the system may, for at least the first user of the plurality of users and based on the preference dependency data, the clique data, the attribute value data, generate, for each item type of a set of item types, output data including an affinity value for each item type off the set of item types.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 7 illustrates an example method that can be carried out by affinity computing device 102 of FIG. 1; and FIG. 8 illustrates an example method that can be carried out by affinity computing device 102 of FIG. 1.

DETAILED DESCRIPTION

Figure 1:
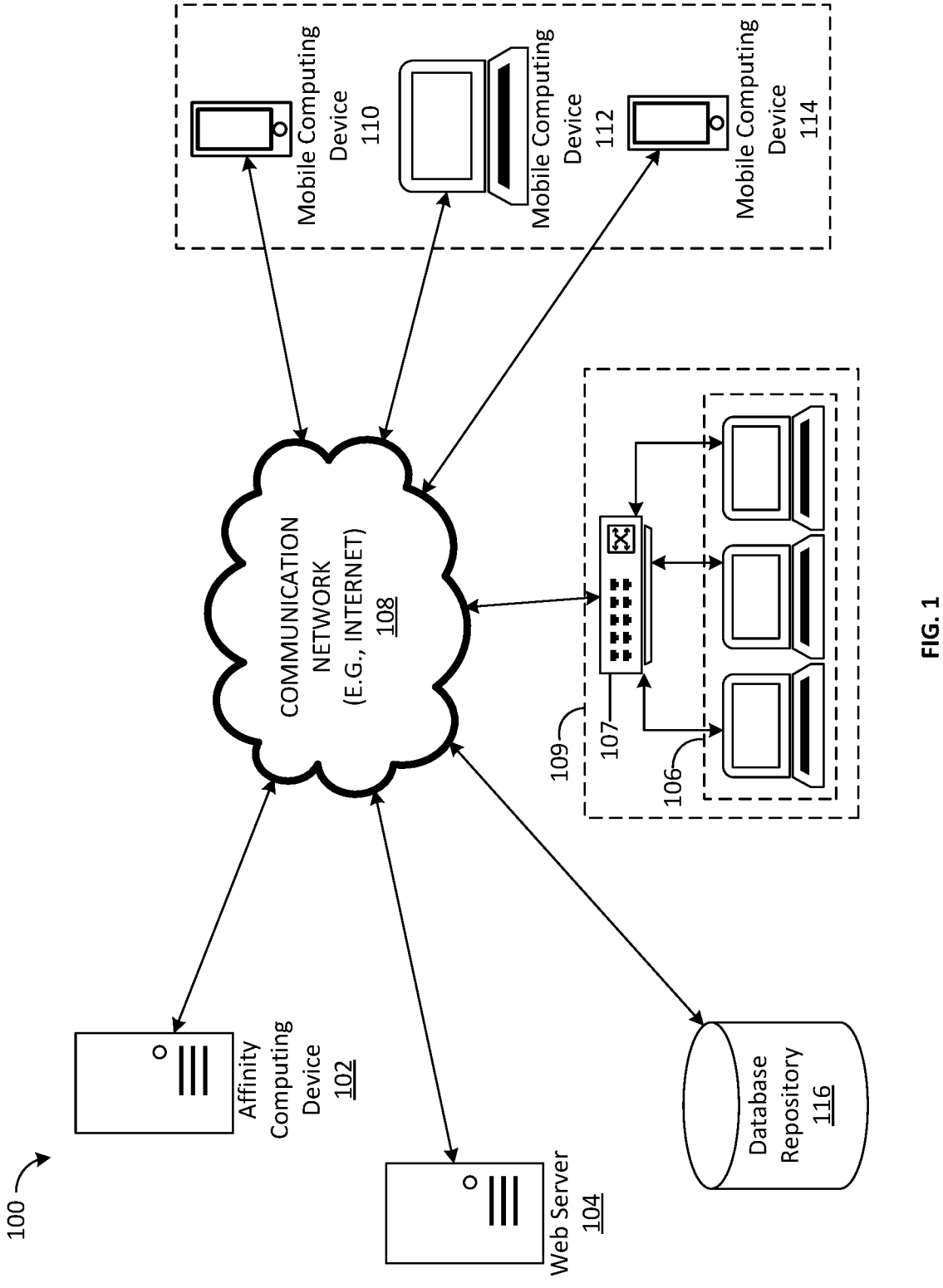
FIG. 1 is a block diagram of an example recommendation engine system that includes an affinity computing device.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

FIG. 1 illustrates a block diagram of an example affinity engine system 100 that includes an affinity computing device 102 (e.g., a server, such as an application server), a web server 104, data repository 116, multiple customer mobile computing devices 110, 112, and 114 operatively coupled over communication network 108. Affinity computing device 102, web server 104 and multiple customer mobile computing devices 110, 112, and 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 108.

In some examples, affinity computing device 102 can be a computer, a workstation, a laptop, a server such as a cloud-based server, or any other suitable device. In some examples, each of multiple customer mobile computing devices 110, 112, and 114 can be a cellular phone, a smart phone, a tablet, a personal assistant device, a voice assistant device, a digital assistant, a laptop, a computer, or any other suitable device. In some examples, affinity computing device 102 is operated by a retailer, and multiple customer mobile computing devices 110, 112, and 114 are operated by customers of the retailer.

Although FIG. 1 illustrates three customer mobile computing devices 110, 112, and 114, affinity engine system 100 can include any number of customer mobile computing devices 110, 112, 114. Similarly, affinity engine system 100 can include any number of affinity computing device 102, web server 104, and data repository 116.

Workstation(s) 106 are operably coupled to communication network 118 via router (or switch) 107. Workstation(s) 106 and/or router 107 may be located at a store 109, for example. Workstation(s) 106 can communicate with affinity computing device 102 over communication network 108. The workstation(s) 106 may send data to, and receive data from, affinity computing device 102. For example, the workstation(s) 106 may transmit transaction data related to one or more orders purchased by customers (e.g., users or customers operating mobile computing devices 110, 112, 114) at store 109 to affinity computing device 102. In some examples, affinity computing device 102 may determine, in response to and based on the received transaction data parse each of the one or more order to determine one or more items purchased in each of the one or more orders and a corresponding customer. Additionally, affinity computing device 102 may further identify an item type each of the one or more items are associated with. Further, affinity computing device 102 may store in data repository 116, data characterizing each of the one or more orders, the corresponding customer (e.g., by customer or visitor ID), the corresponding one or more items, and the associated item type within a corresponding data repository 116, such as transaction data.

In some examples, web server 104 hosts one or more web pages, such as a retailer's website. The website may allow for the purchase of items. Web server 104 may transmit transaction data related to orders purchased on the website by customers to affinity computing device 102. In some examples, affinity computing device 102 may, in response to and based on the received transaction data, parse each of the one or more orders to determine one or more items purchased in each of the one or more orders and a corresponding customer. Additionally, affinity computing device 102 may further identify an item type each of the one or more items are associated with. Further, affinity computing device 102 may store in data repository 116, data characterizing each of the one or more orders, the corresponding customer (e.g., by customer or visitor ID), the corresponding one or more items, and the associated item type within a corresponding data repository 116, such as transaction data.

In some examples, web server 104 transmits user session data to affinity computing device 102. The user session data identifies events associated with browsing sessions and may include user interaction or engagement data characterizing events such as, add-to-cart events and click events. Web server 104 may also transmit search request data to affinity computing device 102. The search request data may identify a search query provided by a customer. In response to and based on receiving user session data, transaction data and/or search request data of a particular customer or user, affinity computing device 102 may generate, output data associated with that user, including affinity values for one or more item types associated with a retailer.

As described herein, a retailer may provide one or more items or products for customers (e.g., users of mobile computing device 110, 112, 114) to purchase. Additionally, each of the one or more items may be associated with or categorized by an item type. For example, apples and oranges may be associated with the item type, fresh fruits and vegetables, while a cola beverage or sparkling water may be associated with the item type, soda.

First customer mobile computing device 110, second customer mobile computing device 112, and N$^{th}$ mobile computing device 114 may communicate with web server 104 over communication network 108. For example, each of multiple mobile computing devices 110 and 112 may be operable to view, access, and interact with a website hosted by web server 104. In some examples, web server 104 hosts a website for a retailer that allows for the purchase of items. The website may further allow a customer to search for items on the website via, for example, a search bar. A customer operating one of multiple mobile computing devices 110, 112 may access the website and perform a search for items on the website by entering in one or more terms into the search bar. In response, the website may return search results identifying one or more items, as described above and further herein. In various implementations, the returned search results may include a graphical representation for each of the one or more items, and one or more interactive features that, when interacted with, triggers a one or more operations. For example, the interactive feature may enable the customer to add one or more of the items to an online shopping cart, and allow the customer to perform a "checkout" of the shopping cart to purchase the added items. In another example, the interactive feature may, when interacted with, cause the website to display additional information about the corresponding item. In other implementations, the graphical representations for each of the one or more items may be an interactive feature or have one or more interactive elements, that when interacted with, causes the website to display additional information regarding the corresponding items.

Affinity computing device 102 is operable to communicate with data repository 116 over communication network 118. For example, affinity computing device 102 can store data to, and read data from, data repository 116. Data repository 116 can be a remote storage device, such as a cloud-based server, a disk (e.g., a hard disk), a memory device on another application server, a networked computer, or any other suitable remote storage. Although shown remote to affinity computing device 102, in some examples, data repository 116 can be a local storage device, such as a hard drive, a non-volatile memory, or a USB stick. Affinity computing device 102 may store purchase data received from store 109 and/or web server 104 in data repository 116. Affinity computing device 102 may also store user session data identifying events associated with browsing sessions, such as when a customer browses a website hosted by web server 104. In various examples, the user session data may include user interaction or engagement data characterizing events, such as, add-to-cart events, click events, and search query data. In some examples, data repository 116 stores one or more machine learning models that, when executed by affinity computing device 102, allow affinity computing device 102 to determine and generate output data associated with a particular user, including affinity values for one or more item types associated with a retailer. In some implementations, the affinity values for the one or more item types may each characterize a likelihood of an occurrence of a purchase event between a that user and the corresponding items within item type.

In some implementations, the affinity values may be based on one or more attributes extracted from transaction data, engagement data and/or search query data. In such implementations, affinity computing device 102 may obtain transaction data and engagement data associated with a particular customer/user (e.g., user or customer of mobile computing device 110, 112 or 114). Additionally, affinity computing device 102 may implement operations that generate, for each item type of a plurality of item types, attribute value data characterizing an attribute value. In such implementations, the operations to generate the attribute value data may include identifying a set of item types or category of items that a purchase event may be associated with. For example, affinity computing device 102 may extract, from transaction data of the user, data characterizing items that user may have purchased. Additionally, affinity computing device 102 may, based on the extracted data characterizing items the user may have purchased, determine an item type or category each of the items may be associated with.

In some examples, the operations to generate the attribute value data may further include extracting, from the transaction data, attribute feature data characterizing attribute features associated with each of the items that the user may have purchased. The attribute features may be associated with one or more preferences or user-type preferences. Examples of the user-type preferences include, but are not limited to, type preferences for various products, price sensitivity at a product/product-type level, brand sensitivity and brand preferences, restriction preferences, restricted foods preferences, dietary methods preferences, dietary needs preferences, allergens preferences, container types preferences, and quantity preferences.

In other examples, the operations to generate the attribute value data may include determining an attribute value for each attribute feature identified in the attribute feature data. In various implementations, the attribute value may characterize a likelihood the user may purchase a particular item or particular item type with a corresponding attribute feature. In such implementations, for a particular user, affinity computing device 102 may determine the attribute value of a particular attribute feature of one or more items of an item type based on the transaction data associated with that particular user. For example, affinity computing device 102 may identify, from transaction data associated with a first user, multiple purchase transactions. In such example, a subset of the multiple purchase transactions includes purchases for milk. Additionally, the data may further identify various attribute features associated with each milk purchase identified in the multiple purchase transactions. For instance, the attribute features associated with the milk purchases may include the brand, the type of milk (e.g., whole, fat free, 2%), flavor, (e.g., chocolate), restricted food preferences (e.g., organic), price, etc. Based at least on the frequency of the purchases of milk and the corresponding identified attribute features of each identified purchase event of milk, affinity computing device 102 may determine and generate an attribute value for each identified attribute feature that characterizes a likelihood the user may purchase milk with the corresponding identified attribute feature. In various implementations, the attribute value may indicate, for a particular item type, a strength of correlation between a purchase event of the user and a particular attribute feature (e.g., price).

In various examples, affinity computing device 102 may aggregate, for each item type, the attribute value of each attribute feature of one or more items of the corresponding item type. For example, affinity computing device 102 may, for a particular user, determine and generate attribute values for each attribute feature of all purchased items of item type, milks. Additionally, affinity computing device 102 may, aggregate for item type, milks, the attribute values of each attribute feature for all purchased items of item type, milks. In various implementations, affinity computing device 102 may apply, for each user, and for each identified item type (e.g., sodas, milks, etc.), a Naïve Bayes model to the determined and generated attribute values associated with the corresponding item type to determine the aggregate attribute value and generate output data for that particular item type.

In implementations where a Naïve Bayes model is applied, since each of the attribute features are treated as independent, the generated aggregated attribute value or output data may not take into account mutually exclusive attribute features, such as attribute features associated with type preferences. For example, for item type "milks," attribute features associated with type preferences for cow's milk, such as "whole" and "2%" are mutually exclusive. In various examples, affinity computing device 102, may implement a set of operations that identify which attribute features of a particular item type are mutually exclusive and generate clique data that characterizes which attribute features of the particular item type are mutually exclusive. Further, affinity computing device 102 may apply the clique data to the Naïve Bayes model, so that the Naïve Bayes model may account for the mutual exclusivity of some attribute features. In such examples, affinity computing device 102 may obtain catalogue data that identifies a plurality of items a particular retailer may provide to a customer (e.g., a user/customer operating mobile computing device 110, 112, 114) for purchase. Additionally, catalogue data may include, for each item of the plurality of items, data characterizing the corresponding item. Examples of such data include item ID, item brand, an item type, an item description and if applicable item options (e.g., a particular item may be sold in different colors and the item options may include data characterizing such color options).

Based on the catalogue data, affinity computing device 102 may generate clique data characterizing, for each item type, one or more cliques. Each of the one or more cliques including a plurality of item attribute features of a set of attribute features that are mutually exclusive. In various implementations, affinity computing device 102 may generate clique data by generating graph clusters of each item type identified from the catalogue data and complementary graph clusters of each generated graph cluster of each item type.

For example, affinity computing device 102 may generate nodes that each represent an attribute feature of an item of the item type. In various examples, the nodes may represent attribute features associated with a particular preference, such as type preference. Additionally, affinity computing device 102 may generate an edge between nodes of attribute features that occur concurrently. In some implementations, affinity computing device 102 may determine that two attribute features occur concurrently based on the item description of a particular item description. For example, an item description of particular item of an item type "milks" may indicate that the particular item is "whole milk and organic." As such, based on the item description of this particular item, affinity computing device 102 may determine that the attribute feature "organic" may occur concurrently with the attribute feature "whole milk." Further, for the graph cluster generated for item types "milk," affinity computing device 102 may generate a node for attribute feature "whole milk," a node for attribute feature "organic," and an edge between the node associated with the attribute feature "whole milk," and the node representing the attribute feature "organic."

Additionally, affinity computing device 102 may generate complementary graph clusters of each generated graph cluster of each item type. The complementary graph cluster is the inverse of its corresponding graph cluster counterpart. For example, for each graph cluster, affinity computing device 102 may generate an edge between each node that does not have an edge with one another as indicated by the corresponding graph clustering, while removing edges between nodes that were indicated by the corresponding graph clustering counterpart as occurring with one another. Based on the complementary graph clustering of each item type, affinity computing device 102 may determine, for each corresponding item type, a set of attribute features that are mutually exclusive and generate, for each item type, clique data characterizing a set of attribute features that are mutually exclusive. In various implementations, affinity computing device 102 may determine, for each complementary graph, the set of attribute features that are mutually exclusive, by identify all the k-cores in each complementary graph. Additionally, each k-core can be identified, iteratively, from 1 degree to K degree to determine all mutually exclusive attribute features of each graph clustering of a particular item type.

In some implementations, affinity computing device 102 may take into account dependencies that may occur between some of the preferences associated with some of the associated attribute features, when determining aggregate attribute value or generate output data for a particular item type. For example, a dependency relationship may occur between attribute feature "sugar free" and attribute feature "cholesterol free." Affinity computing device 102 may determine such relations based on the associated preference of each attribute feature. For instance, affinity computing device 102 may identify a preference associated with each attribute feature identified for each item type. Based on the identified preferences, generate dependency data based on template data. The dependency data characterizes which preferences of a predetermined set of attribute features are dependent on one another for each item type. In various implementations, the preference template data may be initially determined and generated by an operator associated with the affinity computing device 102. Additionally, in such implementations, transaction data, engagement data and search query data may be utilized to update the dependencies characterized in dependency data. In various implementations, the dependency data may be applied to and update the Naïve Bayes model into a Bayesian model. Additionally, the dependency data may be applied to a Naïve Bayes model already modified by the clique data to a Bayesian model that takes into account the mutual exclusivity of various attribute features.

Figure 2:
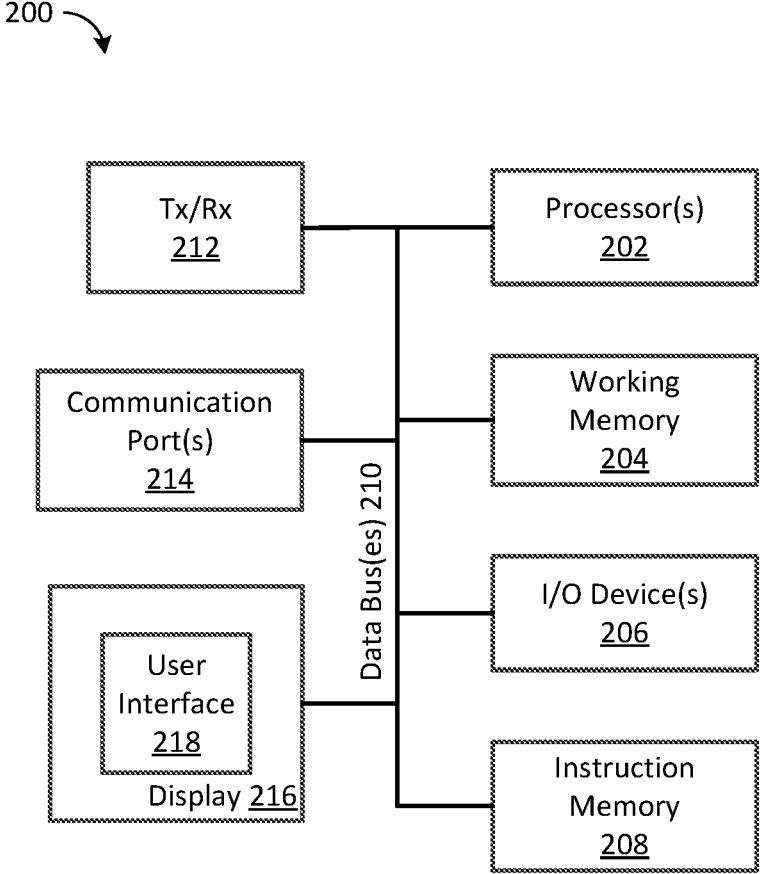
FIG. 2 illustrates a block diagram of example affinity computing device of FIG. 1 in accordance with some embodiments.

FIG. 2 illustrates a block diagram of example affinity computing device 102 of FIG. 1. Affinity computing device 102 can include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 202 can be configured to perform a certain function or operation by executing code, stored on instruction memory 208, embodying the function or operation. For example, processors 202 can be configured to execute code stored in instruction memory 208 to perform one or more of any function, method, or operation disclosed herein.

Additionally, processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of affinity computing device 102. Working memory 204 can be a random access memory (RAM) such as a static random access memory (SRAM) or dynamic random access memory (DRAM), or any other suitable memory.

Input/output devices 206 can include any suitable device that allows for data input or output. For example, input/output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as interaction data, product data, and/or keyword search data.

Display 216 can display user interface 218. User interface 218 can enable user interaction with affinity computing device 102. For example, user interface 218 can be a user interface for an application of a retailer that allows a customer to view and interact with a retailer's website. In some examples, a user can interact with user interface 218 by engaging input/output devices 206. In some examples, display 216 can be a touchscreen, where user interface 218 is displayed on the touchscreen.

Transceiver 212 allows for communication with a network, such as the communication network 108 of FIG. 1. For example, if communication network 108 of FIG. 1 is a cellular network, transceiver 212 is configured to allow communications with the cellular network. In some examples, transceiver 212 is selected based on the type of communication network 108 affinity computing device 102 will be operating in. Processor(s) 202 is operable to receive data from, or send data to, a network, such as communication network 108 of FIG. 1, via transceiver 212.

Affinity Determinations

Figure 3:
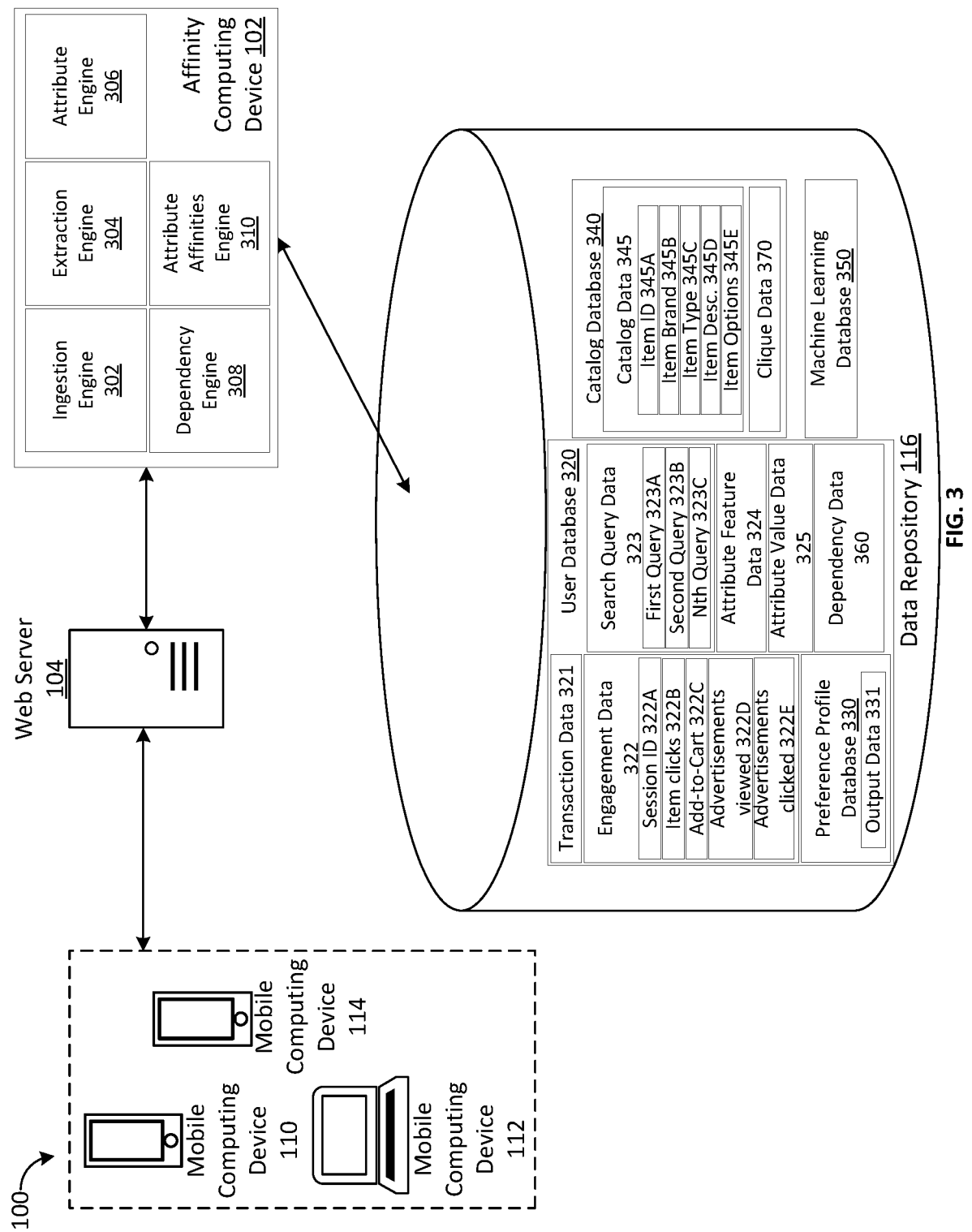
FIG. 3 is a block diagram illustrating examples of various portions of the affinity computing device of FIG. 1 in accordance with some embodiments.

FIG. 3 is a block diagram illustrating examples of various portions of the affinity computing device 102. As illustrated in FIG. 3, affinity computing device 102 can include ingestion engine 302, extraction engine 304, attribute engine 306, dependency engine 308 and attribute affinities engine 310. In some examples, one or more of ingestion engine 302, extraction engine 304, attribute engine 306, dependency engine 308 and attribute affinities engine 310 may be implemented in hardware. In other examples, one or more of ingestion engine 302, extraction engine 304, attribute engine 306, dependency engine 308 and attribute affinities engine 310 may be implemented as an executable program maintained in a tangible, non-transitory memory, such as instruction memory 208 of FIG. 2, that may be executed by one or processors, such as processor 202 of FIG. 2.

Additionally, in various implementations, data repository 116 of FIG. 3, may include user database 320. Affinity computing device 102 may receive user session data from web server 104. Additionally, affinity computing device 102, may execute ingestion engine 302. Executed ingestion engine 302 may obtain one or more elements of user session data and store the one or more elements of user session data within user database 320. In some examples, user session data may be related one or more browsing sessions of a plurality of users of the online platform (e.g., the website hosted by web server 104). Additionally, user session data may include engagement data 322 and search query data 323. Item engagement data 322 includes a session ID 322A (i.e., a website browsing session identifier), item clicks 322B identifying items which the user clicked (e.g., images of items for purchase, keywords to filter reviews for an item), items added-to-cart 322C identifying items added to the user's online shopping cart, advertisements viewed 322D identifying advertisements the user viewed during the browsing session, advertisements clicked 322E identifying advertisements the user clicked on, and user ID 334 ID (e.g., a customer ID, retailer website login ID, visitor ID etc.). Search query data 323 identifies one or more searches conducted by a user during a browsing session (e.g., a current browsing session). In this example, search query data 323 includes first query 323A, second query 323B, and $N^{th}$ query 323C.

User database 320 may also store user transaction data 321. In some example, affinity computing device 102 may receive in-store purchase data identifying and characterizing one or more purchases from one or more stores 109 associated with one or more user of the online platform. In other examples, affinity computing device may receive online purchase data from web server 104, which identifies and characterizes one or more online purchases from an online platform, such as a retailer's website hosted by web server 104. The one or more online purchases may be associated with of one or more users of the online platform. In various implementations, affinity computing device 102 may obtain in store-purchase data and/or online purchase data of a particular time interval (e.g., a particular month, year, number of years, etc.) Executed ingestion engine 302 may parse in-store purchase data and online purchase data to generate transaction data 321 of the one or more users of the online platform within in user database 320.

User database 320 may also store attribute feature data 324. In various implementations, affinity computing device 102 may execute extraction engine 304 to extract or obtain one or more attribute features of one or more items identified in transaction data 321 associated with a plurality of users of the online platform. Additionally, extraction engine 304 may store the extracted or obtained one or more attribute features of one or more items within user database 320, such as attribute feature data 324. In some examples, each of the one or more items may be associated with a particular item type of a plurality of item types. In other examples, each of the one or more items may be associated with a particular user of the plurality of users of the online platform.

User database 320 may also store attribute value data 325. In some implementations, affinity computing device 102 may execute attribute engine 306 to generate attribute value data 325 characterizing an attribute value for each attribute feature of one or more items of each of a plurality of item types. Executed attribute engine 306 may store the attribute value data 325 within user database 320.

User database 320 may store dependency data 360. In various implementations, affinity computing device 102 may obtain template data from a mobile computing device of an operator associated with the retailer (not shown in FIG. 3). In such implementations, the template data may characterize dependencies between attribute features as mapped out by the operator. Additionally, affinity computing device 102 may execute dependency engine 308 to route and store the template data in user database 320, such as dependency data 360. Moreover, for each user of the plurality of users of the online platform, executed dependency engine 308 may, generate dependency data 360 specific to a particular user of the plurality of users. For example, executed dependency engine 308 may generate, for a first user of the plurality of users, dependency data 360 based on the preference template data and transaction data 321, engagement data 322 and search query data 323 of the first user. The dependency data 360 may characterize attribute feature dependencies for each item type specific to the user. As it follows, dependency data 360 for one user may be different for another user. In some examples, executed dependency engine 308 may store dependency data 360 of each of the plurality of users within user database 320.

User database 320 may also store output data 331. Output data 331 may include an affinity value for each item type of the set of item types. Additionally, the affinity value for each item of the set of item types may each characterize a likelihood of an occurrence of a purchase vent between a customer and the corresponding item type. In some implementations, affinity computing device 102 may execute attribute affinities engine 310 to generate, for each of a plurality of users of an online platform, output data 331 for each item type of the set of item types based on the corresponding attribute value data 325, dependency data 360 and clique data 370. Additionally, in some examples, affinity computing device 102 may execute attribute affinities engine 310 to generate a preference profile for each of the plurality of users which includes corresponding output data 331 of the corresponding user. Further, executed attribute affinities engine 310 may store the preference profile for each user of the plurality of users, including the corresponding output data 331 within in user database 320, such as preference profile data 330.

Additionally, data repository 116 may further include catalog database 340. Catalog database 340 may store catalog data 345, which may identify one or more attributes of a plurality of items, such as a portion of or all items a retailer carries. Catalog data 345 may identify, for each of the plurality of items, an item ID 345A (e.g., an SKU number), item brand 345B, item type 345C (e.g., grocery item such as milk, clothing item), item description 345D (e.g., a description of the product including product features, such as ingredients, benefits, use or consumption instructions, or any other suitable description), and item options 345E (e.g., item colors, sizes, flavors, etc.).

Catalog database 340 may store clique data 370. In some implementations, executed attribute engine 306 may generate clique data 370 based on catalogue data 345. Additionally, executed attribute engine 306 may store clique data 370 within catalog database 240.

In some examples, affinity computing device 102 may obtain, for each of a plurality of users of an online platform (e.g., customer/user of mobile computing device 110, 112, 114), attribute value data associated with a number of transactions (e.g., transaction data 321) associated with each of the plurality of users. Additionally, affinity computing device 102 may apply a machine learning model, such as a Naïve Bayes model stored in machine learning database 350, to generate output data including an affinity value for each item type of a set of item types identified from the transaction data of the corresponding user. In some implementations, the affinity values for each of the set of item types may each characterize a likelihood of an occurrence of a purchase event between that customer and the corresponding item type. In some examples, the Naïve Bayes model generate the output data by, for each of the set of item types, aggregating the associated attribute values. To accommodate for mutual exclusivity between the attribute features of each item of an item type and/or dependencies between associated preferences, affinity computing device 102 may apply the corresponding clique data 370 and dependency data 360.

In some implementations, affinity computing device 102 may generate a preference profile for each user of a plurality of users (e.g., users/customers operating mobile computing device 110, 112, 114) of an online platform, such as a website of a retailer hosted by web server 104. In such implementations, affinity computing device 102 may obtain transaction data 321 associated with a particular customer/ user (e.g., user or customer of mobile computing device 110, 112 or 114). Additionally, affinity computing device 102 may implement a first set of operations that generate, for each item type of a plurality of item types, attribute value data characterizing an attribute value. In some examples, the first set of operations may include identifying a set of item types or category of items that a purchase event may be associated with. For example, affinity computing device 102 may execute extraction engine 304 to obtain from user database 320, transaction data 321 associated with a user (e.g., user of mobile computing device 110). Additionally, executed extraction engine 304 may extract, from transaction data of the user, data characterizing items that user may have purchased. Additionally, executed extraction engine 304 may, based on the extracted data characterizing items the user may have purchased, determine an item type or category each of the items may be associated with.

In other examples, the first set of operations may include, extracting, from the transaction data of the user, attribute feature data 324 characterizing attribute features associated with each of the items that the user may have purchased. In various implementations, the attribute features may be associated with one or more user-type preferences. In such implementations, the attribute feature data 324 may indicate which of the preferences or user-type preferences each of the extracted attribute features are associated with. Examples of the user-type preferences include, but are not limited to, type preferences for various products, price sensitivity at a product/product-type level, brand sensitivity and brand preferences, restriction preferences, restricted foods preferences, dietary methods preferences, dietary needs preferences, allergens preferences, container types preferences, and quantity preferences. Additionally, or alternatively, in some implementations, the attribute feature data 324 may indicate the item type each of the extracted attribute features are associated with.

In some examples, the first set of operations may include generating, for each item type, attribute value data 325 based on attribute feature data 324. Attribute value data 325 may include an attribute value for each attribute feature identified in attribute feature data 324 associated with the user, additionally, the attribute value may characterize a likelihood the user may purchase a particular item or particular item type with a corresponding attribute feature. In such implementations, for a particular user, affinity computing device 102 may execute attribute engine 306 to determine the attribute value of a particular attribute feature of one or more items of an item type based on the attribute feature data 324 and transaction data 321 associated with that particular user. In some example, executed attribute engine 306 may identify, from transaction data 321 associated with the user and attribute feature data 324 associated with transaction data 321, the frequency at which different items are being purchased, their corresponding attribute features and item types. Based at least on the frequency of the items being purchased, their corresponding attribute features and item types, executed attribute engine 306 may determine and generate, for each item type, an attribute value for each identified attribute feature. In various implementations, the attribute value may indicate, for a particular item type, a strength of correlation between a purchase event of the user and a corresponding attribute feature (e.g., price).

For example, executed attribute engine 306 may utilize the transaction data 321 and attribute feature data 324 to determine, for a particular user, a subset of the multiple purchase transactions includes purchases for milk. Additionally, based on the transaction data 321 and attribute feature data 324, executed attribute engine 306 may determine various attribute features associated with each milk purchase identified in the multiple purchase transactions. For instance, the attribute features associated with the milk purchases may include the brand, the type of milk (e.g., whole, fat free, 2%), flavor, (e.g., chocolate), restricted food preferences (e.g., organic), price, etc. Based at least on the frequency of the purchases of milk and the corresponding identified attribute features of each identified purchase event of milk, executed attribute engine 306 may determine and generate, for item type "milks," an attribute value for each identified attribute feature. In some examples, the attribute value may characterize a likelihood the user may purchase an item associated with the item type "milks" with the corresponding identified attribute feature, such as "organic". In various implementations, the attribute value may indicate, for a particular user and for item type "milks," a strength of correlation between a purchase event of an item associated with item type "milks" and a particular attribute feature (e.g., price).

In some implementations, based on attribute value data 325 of the user, affinity computing device 102 may aggregate, for each item type, the attribute value of each attribute feature of one or more items of the corresponding item type. For example, following the example above, executed attribute engine 306 may, for the user, determine and generate attribute value data 325 that include an attribute value for each attribute feature of all purchased items of item type, "milks." Additionally, based on the attribute value data 325, executed attribute engine 306 may, aggregate, for item type "milks," the attribute values of each attribute feature for all purchased items of item type "milks."

For instance, executed attribute affinities engine 310 may apply, for each user, a Naïve Bayes model to the determined and generated attribute values (e.g., attribute value data 325) associated with the corresponding item type to determine the aggregate attribute value or generate output data for that particular item type. In such implementations, the attribute features may be taken as a single value or a set of values given the particular corresponding item type of the attribute value. In examples where the item type of the attribute features may be taken as a single value (e.g., item type "chicken"), executed attribute affinities engine 310 may apply a Naïve Bayes model to determine the aggregate attribute value or output data for the item type, in accordance with the following equation:

$$P(A|PT) = P(A = a_i|PT) \tag{eq. 1}$$

In examples where the attribute features may be taken as a set of values (e.g., item type "boneless, skinless, chicken breast"), executed attribute affinities engine 310 may apply a Naïve Bayes model to determine the aggregate attribute value or output data for the item type, in accordance with the following equation:

$$P(A|PT) = \frac{\prod_{a_j \in A'} (1 - P(\alpha_i|PT))^{1-s_i} P(a_i|PT)^{s_i}}{|A'|} \tag{eq. 2}$$

where $s_i = 1$ if $a_i \in A$, 0 otherwise $A'$ is the set of all possible values for the attribute In various implementations, the aggregated attribute values or output data may be based on a weighting of each attribute value of associated attribute features. In such implementations, executed attribute engine 306 may utilize search query data 323 to determine the weightings of each attribute feature of an item type. For example, executed attribute engine 306 may obtain attribute value data 325 corresponding to a particular item type of a particular user (e.g., customer/user of mobile computing device 110, 112, 114). Additionally, executed attribute engine 306 may obtain search query data 323 and engagement data 322 associated with the user to generate attribute relevance data. Attribute relevance data may characterize a weighting or a percentage change of an attribute value of an attribute feature. The engagement data 322 and search query data 323 of a user may indicate which attribute features are more relevant or important to the user. For example, based on search query data 323 and engagement data 322, executed attribute engine 306 may parse through each search query session that the user has initiated (e.g., first query 323A, second query 323B, N$^{th}$ query 323C) and determine which of the corresponding search results resulted in a particular item being added to cart (e.g., add to cart 322C). Additionally, for each item added to cart that stemmed from a search query, executed attribute engine 306 may identify associated attribute features. Based at least on a comparison between the frequency of different items within the same item type were added to cart, executed attribute engine 306 may determine which of the attribute features may be important to the user.

For instance, based on search query data 323 and engagement data 322, attribute engine 306 may identify, for item type "milk," search queries that eventually resulted in milk related items being added to cart—first milk item, second milk item, third milk item, and fourth milk item. Additionally, executed attribute engine 306 may determine attribute features for each milk related item. For example, for first milk item, executed attribute engine 306 may determine that attribute feature associated to brand preference may be "great value," while the attribute feature associated to preference type is "2%"; for second milk item, executed attribute engine 306 may determine that attribute feature associated to brand preference may be "great value," while the attribute feature associated to preference type is "whole"; for third milk item, executed attribute engine 306 may determine that attribute feature associated to brand preference may be "great value," while the attribute feature associated to preference type is "organic, whole"; for fourth milk item, executed attribute engine 306 may determine that attribute feature associated to brand preference may be "horizon," while the attribute feature associated to preference type is "organic, whole"; and for fifth milk item, executed attribute engine 306 may determine that attribute feature associated to brand preference may be "great value," while the attribute feature associated to preference type is "chocolate." Based at least on a comparison between the frequency of each of the milk items that were added to cart, executed attribute engine 306 may determine which attribute feature may be weighted more. For example, following the example, executed attribute engine 306 may at least determine that attribute feature associated to brand preference "great value" may be weighted more.

In some implementations, executed attribute affinities engine 310 may take into account the determined weights of each attribute feature while applying a Naïve Bayes model to determine the aggregate attribute value or output data for the item type. In various examples, attribute affinities engine 310 may determine the aggregate attribute value or output data for the item type by applying the weights and combining attribute features that may be taken as a single value (e.g., item type "chicken") and related attribute feature that may be taken as asset of values (e.g., item type "boneless, skinless, chicken breast'), in accordance with the following equation (and based on equation 1 and 2):

$$\log L = \Sigma_i w_i \log P(A_i|PT) + w_{PT} \log P(PT) \qquad \text{(eq. 3)}$$

where w=the determined weight

In implementations where a Naïve Bayes model is applied, since each of the attribute features are treated as independent, the generated aggregated attribute value or output data may not take into account mutually exclusive attribute features (e.g., attribute features associated with type preferences). For example, for item type "milks,"

attribute features associated with type preferences for cow's milk, such as "whole" and "2%" may be mutually exclusive. In various examples, affinity computing device 102, may implement a set of operations that determine which attribute features of a particular item type are mutually exclusive. Additionally, based on such determinations, affinity computing device 102 may execute attribute engine 306 to generate clique data 370. Clique data 370 may characterize which attribute features of a particular item type are mutually exclusive. Further, for each item type, execute attribute affinities engine 310 may apply corresponding clique data 370 to the Naïve Bayes model, so that the Naïve Bayes model may account for the mutual exclusivity of some attribute features.

In various implementations, executed attribute engine 306 may generate clique data 370 based on catalogue data 345. In such implementations, executed attribute engine 306 may obtain catalogue data 345 that identifies a plurality of items a particular retailer may provide to a customer (e.g., a user/customer operating mobile computing device 110, 112, 114) for purchase. Additionally, catalogue data 345 may include, for each item of the plurality of items, data characterizing the corresponding item. Examples of such data include item ID 345A, and item brand 345B, item type 345C, item description 345D, and item options 345E. Based on catalogue data 345, execute attribute engine 306 may generate clique data characterizing, for each item type, one or more cliques. Each of the one or more cliques includes a plurality of item attribute features of a corresponding set of attribute features that are mutually exclusive.

In various implementations, executed attribute engine 306 may generate clique data 370 by generating graph clusters of each item type identified from the catalogue data 345 and corresponding complementary graph clusters. For example, executed attribute engine 306 may generate nodes that each represent an attribute feature of an item of the item type. Additionally, executed attribute engine 306 may generate an edge between nodes of attribute features that occur concurrently. In some implementations, executed attribute engine 306 may determine that two attribute features occur concurrently based on the item description of a particular item description.

Figure 4A:
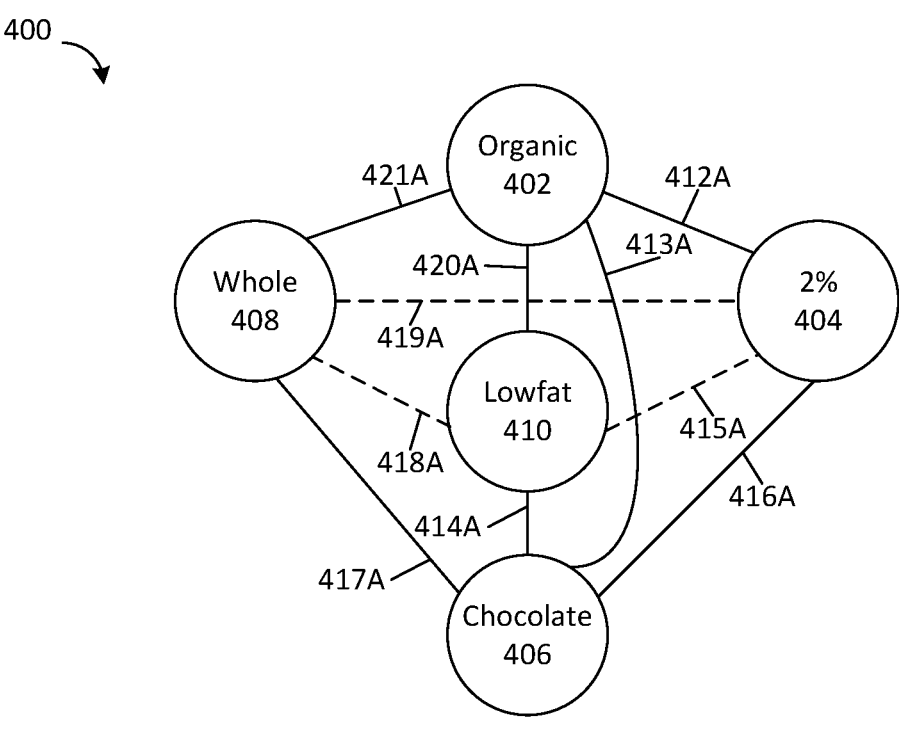
FIGS. 4A and 4B illustrate example graph clusterings in accordance with some embodiments.

FIG. 4A illustrates an example graph clustering for item type "milks." As illustrated in FIG. 4, graph 400 may include a plurality of nodes (e.g., 402, 404, 406, 408 and 410) and edges (e.g., 412A, 413A, 414A, 416A, 417A, 420A, 421A and 422A). In this example, executed attribute engine 306 may determine, for attribute features associated with type preferences and based on the item description 345D of each milk related item of item type "milks," that the attribute feature "organic" may occur concurrently with the attribute feature "whole milk," attribute feature "organic" may occur concurrently with the attribute feature "2%," attribute feature "whole milk" may occur concurrently with the attribute feature "chocolate," attribute feature "chocolate" may occur concurrently with the attribute feature "2%," attribute feature "low fat" may occur concurrently with the attribute feature "organic," and attribute feature "low fat" may occur concurrently with the attribute feature "Chocolate." As such, executed attribute engine 306 may generate nodes for each attribute feature on graph 400. For example, node 402 may represent attribute feature "organic," node 404 may represent attribute feature "2%," node 406 may represent attribute feature "chocolate," node 408 may represent attribute feature "whole milk," and node 410 may represent attribute feature "low fat." Additionally, executed attribute engine 306 may generate an edge between each node-attribute features that occur concurrently. For example, executed attribute engine 306 may generate edge 412A between node 402 and node 404, edge 413A between node 402 and node 406, edge 416A between node 404 and node 406, edge 417A between node 406 and node 408, edge 421A between node 408 and node 402, edge 420A between node 402 and node 410, edge 414A between node 410 and node 406, and edge 419A between node 408 and node 404. Edges 415A, 418A, and 419A illustrate which node-attribute features do not occur concurrently.

Additionally, execute attribute engine 306 may generate complementary graph clusters of each generated graph cluster of each item type. The complementary graph cluster may be the inverse of its corresponding graph cluster counterpart. In various implementations, for each graph cluster, executed attribute engine 306 may generate an edge between each node that does not have an edge with one another as indicated by the corresponding graph clustering. Additionally, executed attribute engine 306 may not generate edges between nodes that were indicated by the corresponding graph clustering counterpart as occurring with one another.

Figure 4B:
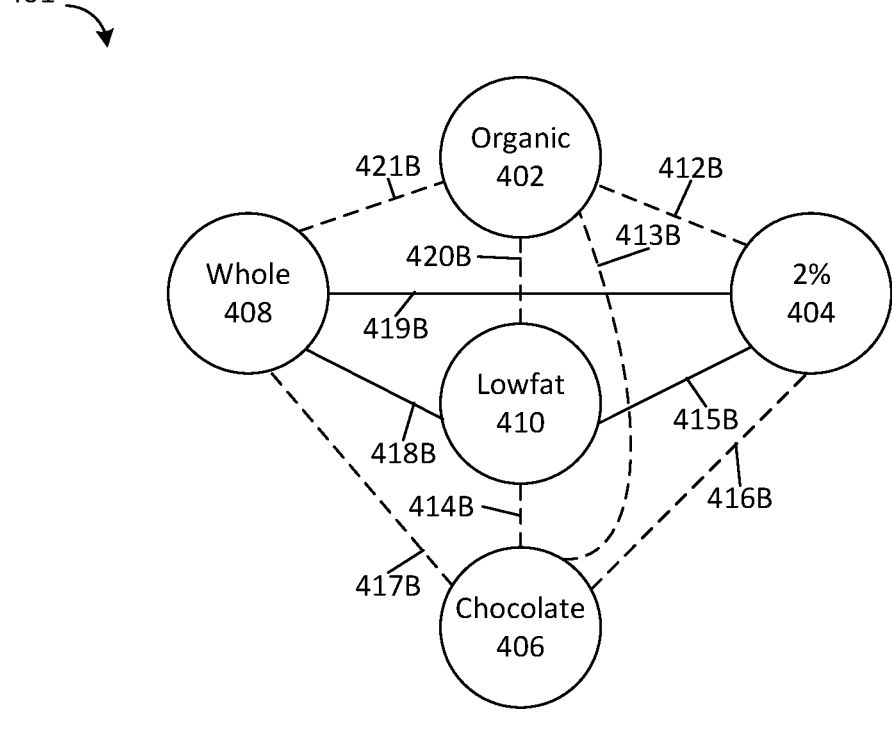

FIG. 4B illustrates an example complementary graph clustering for item type "milks." As illustrated in FIG. 4A, graph 401 may include a plurality of nodes (e.g., 402, 404, 406, 408 and 410) and edges (e.g., 415B, 418B, and 419B). In this example, executed attribute engine 306 may determine, for attribute features associated with type preferences and based on graph 400, which attribute features may not occur concurrently. For example, attribute feature "whole milk" may not occur concurrently with "2%," attribute feature "whole milk" may not occur concurrently with low fat," and attribute feature "low fat" may not occur concurrently with "2%." As such, executed attribute engine 306 may generate nodes for each attribute feature on graph 401. For example, node 402 may represent attribute feature "organic," node 404 may represent attribute feature "2%," node 406 may represent attribute feature "chocolate," node 408 may represent attribute feature "whole milk," and node 410 may represent attribute feature "low fat." Additionally, executed attribute engine 306 may generate an edge between each node-attribute features that do not occur concurrently. For example, executed attribute engine 306 may generate edge 419B between node 404 and node 408, edge 415B between node 404 and node 410, and edge 418B between node 408 and node 410. Edges 412B, 413B, 414B, 416B, 417B, 420B and 421B illustrate which node-attribute features that may occur concurrently.

Based on the complementary graph 401 of each item type, executed attribute engine 306 may determine, for each corresponding item type, a set of attribute features that are mutually exclusive. Based on such determinations, executed attribute engine 306 may generate clique data 370 characterizing a set of attribute features that are mutually exclusive, for each item type. In various implementations, executed attribute engine 306 may determine, for each complementary graph, the set of attribute features that are mutually exclusive, by identify all the k-cores in each complementary graph. Additionally, executed attribute engine 306 may identify each k-core, iteratively, from 1 degree to K degree to determine all mutually exclusive attribute features of each graph clustering of a particular item type.

In examples where the attribute features may be taken as a set of values (e.g., item type "boneless, skinless, chicken breast"), executed attribute affinities engine 310 may take into account the mutual exclusivity between attribute features, such as attribute features associated with type preferences, of an item type while applying apply a Naïve Bayes model to determine the aggregate attribute value or output data for the item type, in accordance with the following equation (and based on equation 3):

$$P(A|PT) = \frac{\prod_{a_j \in \bigcup_{i=1}^{k}(A_i \cap A)} P(a_j|PT)}{k} \quad \text{(eq. 4)}$$

where, from graph clustering $$\bigcup_{i=1}^{k} A_i$$

such that $\forall i$, $|A \cap A_i| = 1$.

In some implementations, affinity computing device 102 may take into account dependencies that may occur between some of the associated attribute features, when determining aggregate attribute value or generate output data for a particular item type. For example, a dependency relationship may occur between attribute features associated with restriction preferences, such "sugar free" and attribute features associated with dietary needs preferences, such as "low calorie." For instance, attribute feature "sugar free" may imply "low calorie," and as such, "low calorie" may be depend on "sugar free."

Affinity computing device 102 may execute dependency engine 308 to determine such relations based on the each attribute feature. Additionally, in various implementations, executed dependency engine 308 may generate dependency data 360 based on predetermined dependency template. In some examples, dependency data 360 may characterize which preference of a predetermined set of attribute features are dependent on one another for each item type. In other examples, the predetermined dependency template may be initially determined and generated by an operator associated with the affinity computing device 102.

In some implementations, executed dependency engine 308 may, for each user of the plurality of users of the online platform, generate dependency data 360 specific to a particular user of the plurality of users. For example, executed dependency engine 308 may generate, for a first user of the plurality of users, dependency data 360 based on the preference template data and transaction data 321, engagement data 322 and search query data 323 associated with the first user. The dependency data may characterize attribute feature dependencies specific to the user. As it follows, dependency data 360 for one user may be different for another user. In some examples, executed dependency engine 308 may store dependency data 360 of each of the plurality of users within user database 320.

In various implementations, executed attribute affinities engine 310 may obtain dependency data 360 from dependency engine 308. Additionally, executed attribute affinities engine 310 may apply dependency data 360 to update the Naïve Bayes model into a Bayesian model. For example, prior to the Naïve Bayes model being updated, the Naïve Bayes model may be applied to determined and generated attribute values of a particular item type, in accordance with the following equation:

$$L = P(PT) * P(R|PT) * P(D|PT) \quad \text{(eq. 5)}$$

where P(PT)=attribute value for product/product type;
    P(R|PT)=attribute value for an attribute feature associated with a restriction preference; and P(D|PT)=attribute value for an attribute feature associated with a dietary need preference.

However, after the Naïve Bayes model is updated to take into account a dependency relationship between attribute features of a restriction preference and attribute features of a dietary need preference, the Naïve Bayes model may be applied to determined and generated attribute values of a particular item type, in accordance to the following equation:

$$L=P(PT)*P(R|PT)*P(D|PT,R) \qquad \text{(eq. 6)}$$

where P(PT)=attribute value for product/product type;

P(R|PT)=attribute value for an attribute feature associated with a restriction preference; and P(D|PT, R)=attribute value for an attribute feature associated with a dietary need preference that is dependent on the restriction preference.

In some implementations, executed attribute affinities engine 310 may store the updated Naïve Bayes model or Bayesian model into machine learning database 350. Additionally, executed attribute affinities engine 310 may apply the updated Naïve Bayes model or Bayesian model to determined and generated attribute values of each of a plurality of item types, to generate output data including an affinity value for each item type of a set of item types identified from the transaction data of the corresponding user. In some implementations, the affinity values for each of the set of item types may each characterize a likelihood of an occurrence of a purchase event between that customer and the corresponding item type. Additionally, the output data may be associated with a particular customer/user (e.g., user of mobile computing device 110, 112, 114). Additionally, execute attribute affinities engine 310 may generate a preference profile for each of the plurality of users which includes corresponding output data 331 of the corresponding user.

In various implementations, affinity computing device 102 may provide preference profile data of a user to various channels associated with a retailer to better personalize the user's experience with the retailer. In some examples, a channel associated with the retailer may be an online ecommerce platform, such as a website hosted by web server 104. Additionally, the ecommerce platform may coordinate with a search engine system, that, when utilizing the preference profile data of the user when the user submits search queries, may return better personalized search results to the user. Further, since the output data 331 included in the preference profile data is based on attribute features of item types, the search results may include results that the user may not normally be exposed to. For example, in the context of an online retail website, the search result of a user's search query, may include products or items the user may not normally be exposed to. Conventional search engine systems may be based on attributes of items the user may have interacted with, while the output data 331 of preference profile data is based on attribute features of item types.

In other examples, a channel associated with the retailer may be a remote notification system that packages notifications of particular items based on preferences, transactions and engagements between the user and the retailer. Such notifications may include digital content that the user/customer of the retailer may be interested. The digital content may be related to or associated with an item the retailer can provide to the user. In such examples, the remote notification system may obtain the preference profile data of the user/customer. Additionally, when determining, which notifications to package and transmit to a mobile computing device of the user (e.g., mobile computing device 110, 112, 114), the remote notification system may utilize the output data 331 included in the preference profile data of the user. Further, since the output data 331 included in the preference profile data is based on attribute features of item types and not attributes of items, the determined notifications may include notifications of digital content that the user may not normally be exposed to.

In yet other examples, a channel associated with the retailer may be a voice search engine system. In such examples, the voice search engine system may utilize the preference profile data of the user when the user submits voice search queries, may return better personalized search results to the user. Further, since the output data 331 included in the preference profile data is based on attribute features of item types, the search results may include results that the user may not normally be exposed to. For example, in the context of a voice search engine system associated with a retailer, the search result of a user's voice search query, may include products or items the user may not be normally exposed to. Conventional search engine systems may be based on attributes of items the user may have interacted with, while the output data 331 of preference profile data is based on attribute features of item types.

Methodology

Figure 5:
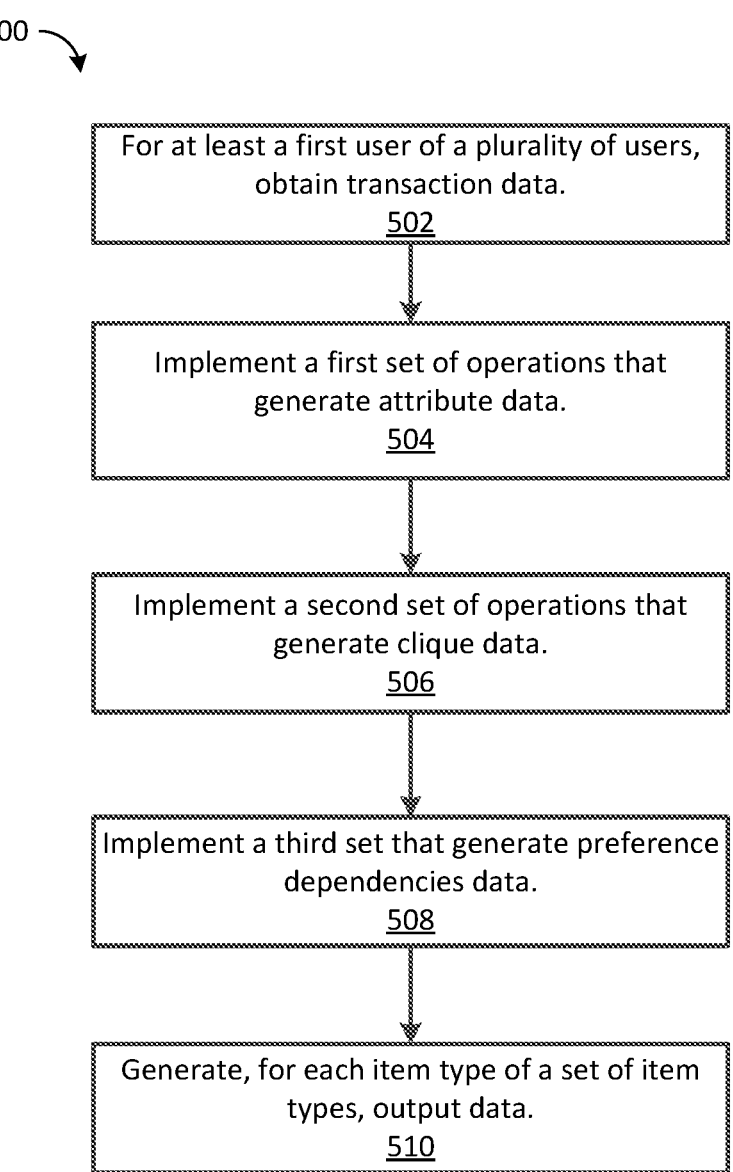
FIG. 5 illustrates an example method that can be carried out by the affinity computing device 102 of FIG. 1.
Figure 6:
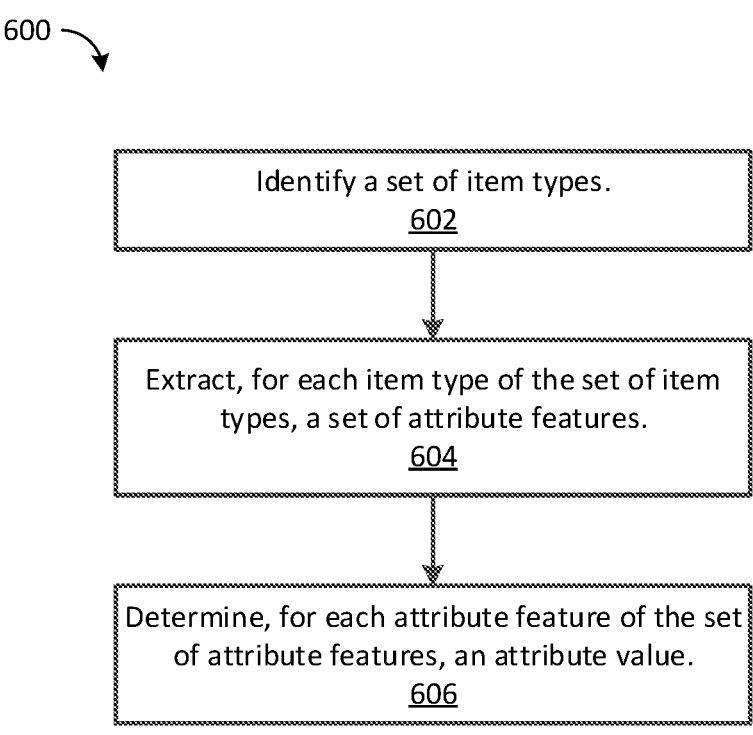
FIG. 6 illustrates an example method that can be carried out by affinity computing device 102 of FIG. 1.

FIG. 5 illustrates an example method that can be carried out by the affinity computing device 102 of FIG. 1. FIG. 6 illustrates an example method that can be carried out by affinity computing device 102 of FIG. 1. FIG. 7 illustrates an example method that can be carried out by affinity computing device 102 of FIG. 1. FIG. 8 illustrates an example method that can be carried out by affinity computing device 102 of FIG. 1. In describing an example method of FIGS. 5, 6, 7 and 8, reference is made to elements of FIG. 1-3 for purpose of illustrating a suitable component for performing a step or sub-step being described.

With reference to example method 500 of FIG. 5, affinity computing device 102 may, for at least a first user of a plurality of users, obtain transaction data (502). In some implementations, affinity computing device 102 may obtain transaction data 321 associated with a particular customer/user (e.g., user or customer of mobile computing device 110, 112 or 114).

Additionally, affinity computing device 102 may implement a first set of operations that generate attribute value data 325 (504). In some implementations, affinity computing device 102 may implement a first set of operations that generate, for each item type of a plurality of item types, attribute value data 325 characterizing an attribute value. In such implementations, affinity computing device 102 may execute extraction engine 304 to generate for each item type of a plurality of item types, attribute value data 325 characterizing an attribute value, based on the transaction data 321 of the first user. In various examples, the attribute value may characterize a likelihood the first user may purchase a particular item or particular item type with a corresponding attribute feature.

Moreover, affinity computing device 102 may implement a second set of operations that generate clique data (506). In various implementations, affinity computing device 102 may take into account the mutual exclusivity between attribute features of a particular item type (e.g., attribute features associated with a particular preference, such as type preference), when determining and generating output data 331. As such, in various examples, affinity computing device 102, may determine which attribute features of a particular item type are mutually exclusive. Additionally, based on such determinations, affinity computing device 102 may execute attribute engine 306 to generate clique data 370. Clique data 370 may characterize which attribute features of a particular item type are mutually exclusive.

In various implementations, execute attribute engine 306 may generate clique data 370 based on catalogue data 345. In such implementations, execute attribute engine 306 may obtain catalogue data 345 that identifies a plurality of items a particular retailer may provide to a customer (e.g., a user/customer operating mobile computing device 110, 112, 114) for purchase. Additionally, executed attribute engine 306 may generate clique data 370 by generating graph clusters of each item type identified from the catalogue data 345 and corresponding complementary graph clusters.

Further, affinity computing device 102 may implement a third set of operations that generate dependency data 360 (508). In various examples, affinity computing device 102 may take into account dependencies that may occur between some of the associated attribute features, when determining aggregate attribute value or generate output data for a particular item type. Affinity computing device 102 may execute dependency engine 308 to determine such relations based on each attribute feature. For example, executed dependency engine 308 may generate dependency data 360 based on predetermined dependency template. In some examples, dependency data 360 may characterize which preferences of a predetermined set of attribute features are dependent on one another for each item type. In other examples, the predetermined dependency template may be initially determined and generated by an operator associated with the affinity computing device 102.

Based on the attribute value data 325, clique data 370 and dependency data 360, affinity computing device 102 may generate, for each item type of a set of item types, output data (510). In some implementations, attribute affinities engine 310 may apply clique data 370 to a Naïve Bayes model, so that the Naïve Bayes model may account for the mutual exclusivity of some attribute features. In other implementations, attribute affinities engine 310 may apply dependency data 360 to update the Naïve Bayes model into a Bayesian model. In yet other implementations, attribute affinities engine 310 may apply dependency data 360 to a Naïve Bayes model already modified by the clique data to a full Bayesian model. That way the updated Naïve Bayes/Bayesian model can take into account the mutual exclusivity of various attribute features.

With reference to example method 600 of FIG. 6, affinity computing device 102 may, for at least a first user of a plurality of users, identify a set of item types (602), based on the transaction data 321 of the first user. In some examples, affinity computing device 102 may execute extraction engine 304 to obtain from user database 320, transaction data 321 associated with a user (e.g., user of mobile computing device 110). Additionally, executed extraction engine 304 may extract, from transaction data of the user, data characterizing items that user may have purchased. Additionally, executed extraction engine 304 may, based on the extracted data characterizing items the user may have purchased, determine an item type or category each of the items may be associated with.

Additionally, affinity computing device 102 may, extract, for each item type of the set of item types, a set of attribute features (604). For example, executed extraction engine 304 may extract, from the transaction data 321 of a first user, attribute feature data 324. In some examples, attribute feature data 324 may characterize a set of attribute features associated with each of the items that the user may have purchased. Additionally, the attribute features may be associated with one or more user-type preferences. In such implementations, the attribute feature data 324 may indicate which of the user-type preferences each of the extracted attribute features are associated with.

Moreover, affinity computing device 102 may determine, for each attribute feature of the set of attribute features, an attribute value (606). For example, executed attribute engine 306 may generate, for each item type, attribute value data 325 based on attribute feature data 324. Attribute value data 325 may include an attribute value for each attribute feature identified in attribute feature data 324 associated with the user. Additionally, the attribute value may characterize a likelihood the user may purchase a particular item or particular item type with a corresponding attribute feature.

With reference to example method 700 of FIG. 7, affinity computing device 102 may, for at least a first user of a plurality of users, identify a set of item types (702), based on catalogue data 345. For example, executed attribute engine 306 may obtain catalogue data 345 that identifies a plurality of items a particular retailer may provide to a customer (e.g., a user/customer operating mobile computing device 110, 112, 114) for purchase. Additionally, executed attribute engine 306 may identify the plurality of items based on the catalogue data 345. Each item of the plurality of items may be associated with an item type.

Additionally, affinity computing device 102 may extract one or more attribute features of each item of the set of item types (704). In some examples, executed attribute engine 306 may parse through data characterizing each item to extract the one or more features. Examples of such data include item ID 345A, and item brand 345B, item type 345C, item description 345D, and item options 345E.

Moreover, affinity computing device 102, based on catalogue data 345 associated with each item of an item type, may determine pairs of attributes that occur concurrently. For example, execute attribute engine 306 may determine which attribute features occur concurrently based on the item description 345D of each item of an item type. Further, based on such determinations, affinity computing device 102 may generate, for each item type, a graph clustering (708) and a complementary graph clustering (710).

For example, executed attribute engine 306 may generate a graph clustering that includes nodes that each represent an attribute feature of an item of the item type. Additionally, executed attribute engine 306 may generate an edge between nodes of attribute features that occur concurrently, based on the determinations of which attributes occur concurrently. In some implementations, executed attribute engine 306 may determine that two attribute features occur concurrently based on the item description of a particular item description. For example, an item description of particular item of an item type "milks" may indicate that the particular item is "whole milk and organic." As such, based on the item description of this particular item, executed attribute engine 306 may determine that the attribute feature "organic" may occur concurrently with the attribute feature "whole milk." Further, for the graph clustering generated for item types "milk," executed attribute engine 306 may generate a node for attribute feature "whole milk," a node for attribute feature "organic," and an edge between the node associated with the attribute feature "whole milk," and the node representing the attribute feature "organic."

In another example, executed attribute engine 306 may generate complementary graph clusters of each generated graph cluster of each item type. The complementary graph cluster is the inverse of its corresponding graph cluster counterpart. For example, for each graph cluster, executed attribute engine 306 may generate an edge between each node that does not have an edge with one another as indicated by the corresponding graph clustering, while removing edges between nodes that were indicated by the corresponding graph clustering counterpart as occurring with one another. In various implementations, executed attribute engine 306 may determine, for each complementary graph, the set of attribute features that are mutually exclusive, by identify all the k-cores in each complementary graph. Additionally, each k-core can be identified, iteratively, from 1 degree to K degree to determine all mutually exclusive attribute features of each graph clustering of a particular item type.

In various implementations, affinity computing device 102 may generate clique data 370 identifying a set of mutually exclusive attributes associated with each item type (712) based on the complementary graph clustering of each item type. For example, based on the complementary graph clustering of each item type, executed attribute engine 306 may determine, for each corresponding item type, a set of attribute features that are mutually exclusive. Additionally, based on such determinations, executed attribute engine 306 may generate, for each item type, clique data characterizing a set of attribute features that are mutually exclusive.

With reference to example method 800 of FIG. 8, affinity computing device 102 may, for at least a first user of a plurality of users, identify a set of preferences (802), based on attribute feature data 324. In some examples attribute feature data 324 may characterize a set of attribute features associated with each of the items that the user may have purchased. Additionally, the attribute features may be associated with one or more user-type preferences. In such implementations, the attribute feature data 324 may indicate which of the user-type preferences each of the extracted attribute features are associated with.

Additionally, affinity computing device 102 may generate dependency data 360 characterizing, for each item type, dependencies between some of the attribute features (804) based on dependency template data. In some examples, dependency template data may characterize dependencies between attribute features of an item type as mapped out by an operator associated with affinity computing device 102.

Moreover, affinity computing device 102 may update the dependency data 360 (806), based on transaction data 321, engagement data 322 and search query data 323 of a particular user. Further, affinity computing device 102 may generate output data 331 based at least on updated dependency data 360 (808). For example, the updated dependency data 360 may be utilized by executed attribute affinities engine 310 when generating output data 331 for the particular user. For example, executed attribute affinities engine 310 may apply the dependency data 360 to a Naïve Bayes model to generate output data 331. Additionally, or alternatively, attribute affinities engine 310 may apply the dependency data 360 to a Naïve Bayes mode already modified by clique data 370 to generate output data 331.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two.

The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:

a database storing catalogue data and, for each user of a plurality of users of an online platform, transaction data, engagement data and search query data;

at least one processor; and a memory resource storing instructions, that when executed by the at least one processor, causes the at least one processor to:

for at least a first user of the plurality of users:

based on the transaction data of the at least first user, implement a first set of operations that generate, for each of a first set of item types, attribute value data characterizing an attribute value for each attribute feature of one or more items associated with each of the first set of item types;

apply a Naive Bayes model to the attribute value data to generate output data including an affinity value for each item type of the first set of item types, wherein the Naive Bayes model is a machine learning model stored in a machine learning database and trained based on attribute features that are treated as independent to each other;

based on the catalogue data, implement a second set of operations that generate, for each of a second set of item types identified in the catalogue data, clique data characterizing one or more cliques based on graph clustering, each of the one or more cliques identifying a subset of attribute features of a set of attribute features that are mutually exclusive, wherein the second set of operations includes:

based on the catalogue data, generating, for each item type identified from the catalogue data, a corresponding graph cluster comprising nodes and edges, wherein each node in the corresponding graph cluster represents an attribute feature of an item of the item type, wherein each edge in the corresponding graph cluster connects two nodes representing attribute features that occur concurrently, generating, for each item type identified from the catalogue data, a complementary graph cluster that is an inverse of the corresponding graph cluster, wherein each edge in the complementary graph cluster connects two nodes that are not connected by any edge in the corresponding graph cluster, wherein each edge in the complementary graph cluster connects two nodes representing attribute features that do not occur concurrently, and determining, based on the complementary graph cluster for each item type identified from the catalogue data, the set of attribute features that are mutually exclusive;

create a first training dataset that comprises the clique data and attribute features including the set of attribute features that are mutually exclusive;

re-train the Naive Bayes model using the first training dataset to generate a first Bayesian model that accounts for a mutual exclusivity between attribute features of items;

based at least in part on the transaction data, engagement data and search query data of at least the first user, implement a third set of operations that generate dependency data characterizing one or more dependencies between each attribute feature of a set of predetermined attribute features based on at least one predetermined dependency template;

create a second training dataset that comprises the first training dataset, the dependency data, and the set of predetermined attribute features;

re-train the first Bayesian model using the second training dataset to generate a second Bayesian model that accounts for both the mutual exclusivity between attribute features of items and a dependency relationship between attribute features of items; and apply the second Bayesian model to the attribute value data to generate updated output data.

2. The system of claim 1, wherein the first set of operations includes:

based on the transaction data of at least the first user, identifying the first set of item types;

based on the transaction data, generating, for each item type of the first set of item types, attribute feature data, the attribute feature data characterizing a set of attribute features;

based on the transaction data, the engagement data and set of user attribute features, generate attribute value data that indicates, for each of the set of attribute features, the attribute value.

3. The system of claim 1, wherein the affinity value of each item type of the set of item types indicates a likelihood of an occurrence of a purchase event between the at least first user and one or more items of the corresponding item type.

4. The system of claim 1, wherein each attribute feature is associated with a preference of a preference set, the set of preferences including at least one of (i) type preferences for various products, (ii) price sensitivity at a product/product-type level, (iii), brand sensitivity and preferences, (iv) restriction preferences, (v) restricted foods preferences, (vi) dietary methods preferences, (vii) dietary needs preferences, (viii) allergens preferences, (viv) container types preferences, and (x) quantity preferences.

5. The system of claim 1, wherein the attribute value data characterizes a likelihood of an occurrence of a purchase event between the at least first user and a particular item of a particular item type with the corresponding attribute feature.

6. The system of claim 1, wherein the clique data is further based on search query data.

7. A computer-implemented method comprising:

for at least a first user of a plurality of users:

based on transaction data of at least the first user, implementing a first set of operations that generate, for each of a first set of item types, attribute value data characterizing an attribute value for each attribute feature of one or more items associated with each of the first set of item types;

applying a Naïve Bayes model to the attribute value data to generate output data including an affinity value for each item type of the first set of item types, wherein the Naïve Bayes model is a machine learning model stored in a machine learning database and trained based on attribute features that are treated as independent to each other;

based on catalogue data, implementing a second set of operations that generate, for each of a second set of item types identified in the catalogue data, clique data characterizing one or more cliques based on graph clustering, each of the one or more cliques identifying a subset of attribute features of a set of attribute features that are mutually exclusive, wherein the second set of operations includes:

based on the catalogue data, generating, for each item type identified from the catalogue data, a corresponding graph cluster comprising nodes and edges, wherein each node in the corresponding graph cluster represents an attribute feature of an item of the item type, wherein each edge in the corresponding graph cluster connects two nodes representing attribute features that occur concurrently, generating, for each item type identified from the catalogue data, a complementary graph cluster that is an inverse of the corresponding graph cluster, wherein each edge in the complementary graph cluster connects two nodes that are not connected by any edge in the corresponding graph cluster, wherein each edge in the complementary graph cluster connects two nodes representing attribute features that do not occur concurrently, and determining, based on the complementary graph cluster for each item type identified from the catalogue data, the set of attribute features that are mutually exclusive;

creating a first training dataset that comprises the clique data and attribute features including the set of attribute features that are mutually exclusive;

re-training the Naive Bayes model using the first training dataset to generate a first Bayesian model that accounts for a mutual exclusivity between attribute features of items;

based at least in part on the transaction data, engagement data and search query data of at least the first user, implementing a third set of operations that generate dependency data characterizing one or more dependencies between each attribute feature of a set of predetermined attribute features based on at least one predetermined dependency template;

creating a second training dataset that comprises the first training dataset, the dependency data, and the set of predetermined attribute features;

re-training the first Bayesian model using the second training dataset to generate a second-neural network Bayesian model that accounts for both the mutual exclusivity between attribute features of items and a dependency relationship between attribute features of items; and applying the second Bayesian model to the attribute value data to generate updated output data.

8. The computer-implemented method of claim 7, wherein the first set of operations includes:

based on the transaction data of at least the first user, identifying the first set of item types;

based on the transaction data, generating, for each item type of the first set of item types, attribute feature data, the attribute feature data characterizing a set of attribute features;

based on the transaction data, the engagement data and set of user attribute features, generate attribute value data that indicates, for each of the set of attribute features, the attribute value.

9. The computer-implemented method of claim 7, wherein the affinity value of each item type of the set of item types indicates a likelihood of an occurrence of a purchase event between the at least first user and one or more items of the corresponding item type.

10. The computer-implemented method of claim 7, wherein each attribute feature is associated with a preference of a preference set, the set of preferences including at least one of (i) type preferences for various products, (ii) price Sensitivity at a product/product-type level, (iii) brand Sensitivity and Preferences, (iv) Restriction preferences, (v) Restricted Foods Preferences, (vi) Dietary Methods Preferences, (vii) Dietary Needs Preferences, (viii) Allergens Preferences, (viv) Container Types Preferences, and (x) Quantity Preferences.

11. The computer-implemented method of claim 7, wherein the attribute value data characterizes a likelihood of an occurrence of a purchase event between the at least first user and a particular item of a particular item type with the corresponding attribute feature.

12. A non-transitory computer readable medium storing instructions, that when executed by at least one processor, causes a system to:

for at least a first user of a plurality of users:

based on transaction data of at least the first user, implement a first set of operations that generate, for each of a first set of item types, attribute value data characterizing an attribute value for each attribute feature of one or more items associated with each of the first set of item types;

apply a Naive Bayes model to the attribute value data to generate output data including an affinity value for each item type of the first set of item types, wherein the Naive Bayes model is a machine learning model stored in a machine learning database and trained based on attribute features that are treated as independent to each other;

based on catalogue data, implement a second set of operations that generate, for each of a second set of item types identified in the catalogue data, clique data characterizing one or more cliques based on graph clustering, each of the one or more cliques identifying a subset of attribute features of a set of attribute features that are mutually exclusive, wherein the second set of operations includes:

based on the catalogue data, generating, for each item type identified from the catalogue data, a corresponding graph cluster comprising nodes and edges, wherein each node in the corresponding graph cluster represents an attribute feature of an item of the item type, wherein each edge in the corresponding graph cluster connects two nodes representing attribute features that occur concurrently, generating, for each item type identified from the catalogue data, a complementary graph cluster that is an inverse of the corresponding graph cluster, wherein each edge in the complementary graph cluster connects two nodes that are not connected by any edge in the corresponding graph cluster, wherein each edge in the complementary graph cluster connects two nodes representing attribute features that do not occur concurrently, and determining, based on the complementary graph cluster for each item type identified from the catalogue data, the set of attribute features that are mutually exclusive;

create a first training dataset that comprises the clique data and attribute features including the set of attribute features that are mutually exclusive;

re-train the Naive Bayes model using the first training dataset to generate a first Bayesian model that accounts for a mutual exclusivity between attribute features of items;

based at least in part on the transaction data, engagement data and search query data of at least the first user, implement a third set of operations that generate dependency data characterizing one or more dependencies between each attribute feature of the set of predetermined attribute features based on at least one predetermined dependency template;

create a second training dataset that comprises the first training dataset, the dependency data, and the set of predetermined attribute features;

re-train the first Bayesian model using the second training dataset to generate a second Bayesian model that accounts for both the mutual exclusivity between attribute features of items and a dependency relationship between attribute features of items; and apply the second Bayesian model to the attribute value data to generate updated output data.

* * * * *